M. MEYERS.
POWER CLAMP.
APPLICATION FILED JAN. 6, 1912.

1,060,477.

Patented Apr. 29, 1913.
2 SHEETS—SHEET 1.

Witnesses—
Walter Chism
Willet Burrows

Inventor—
Max Meyers.
by his Attorneys:
Howen & Howen

M. MEYERS.
POWER CLAMP.
APPLICATION FILED JAN. 6, 1912.
1,060,477.
Patented Apr. 29, 1913.
2 SHEETS—SHEET 2.
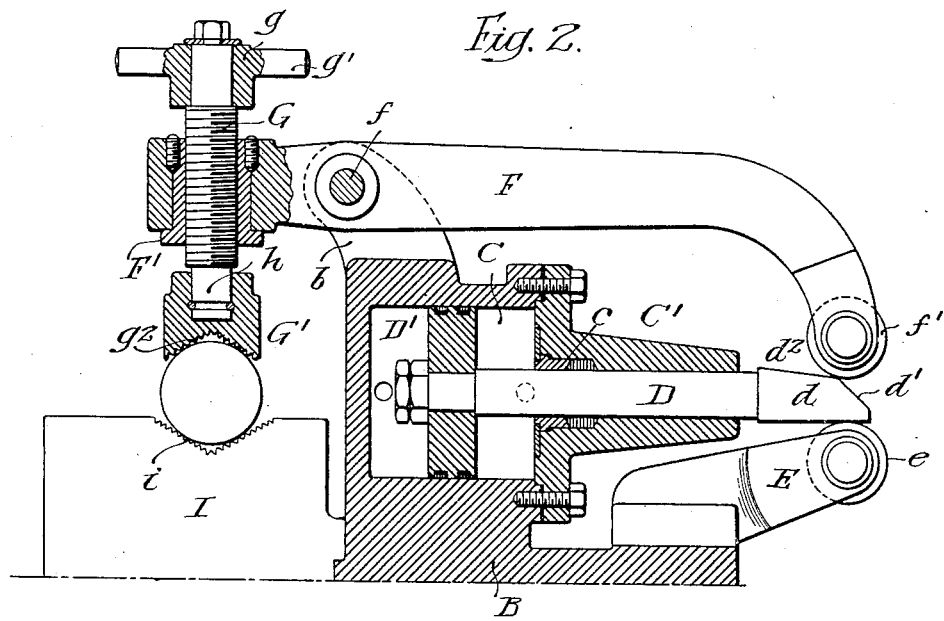
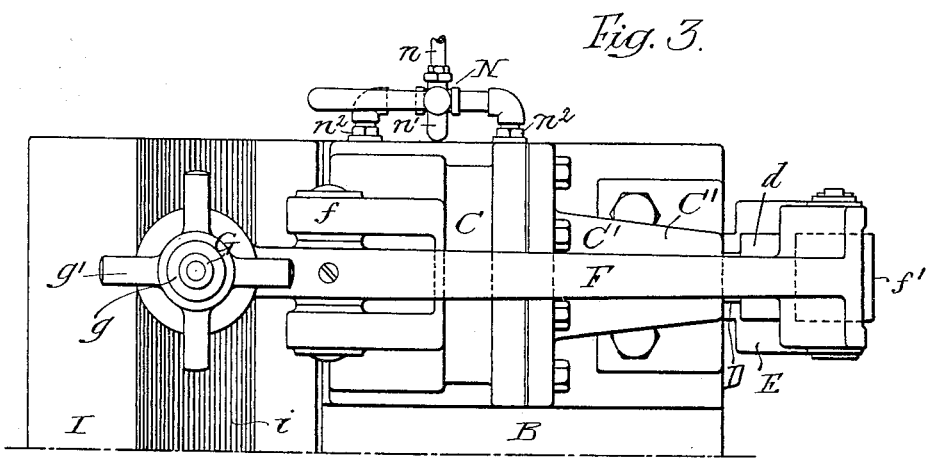
Witnesses—
Walter Chism
Willet Burrowes
Inventor—
Max Meyers.
by his Attorneys—
Howson & Howson

UNITED STATES PATENT OFFICE.

MAX MEYERS, OF PHILADELPHIA, PENNSYLVANIA, ASSIGNOR TO NEWTON MACHINE TOOL WORKS, INCORPORATED, OF PHILADELPHIA, PENNSYLVANIA, A CORPORATION OF PENNSYLVANIA.

POWER-CLAMP.

1,060,477. Specification of Letters Patent. Patented Apr. 29, 1913.

Application filed January 6, 1912. Serial No. 669,801.

*To all whom it may concern:*

Be it known that I, MAX MEYERS, a citizen of the United States, residing in Philadelphia, Pennsylvania, have invented certain Improvements in Power-Clamps, of which the following is a specification.

The object of my invention is to construct a simple and effective power clamp for use in holding work on metal working machines; particularly on metal saws or cutting off tools where a clamp must be quickly, accurately and firmly adjusted.

Figure 1:
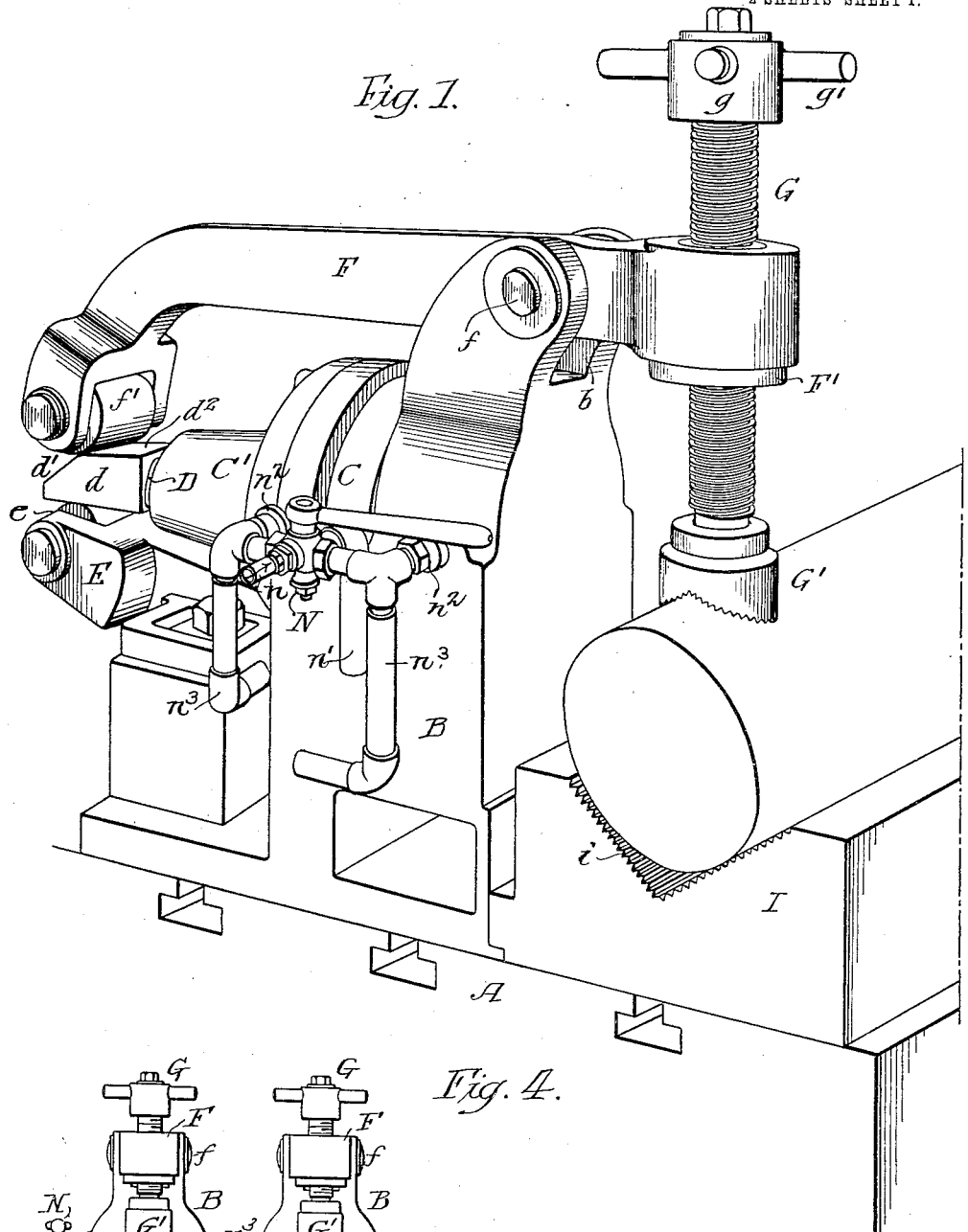
Figure 4:
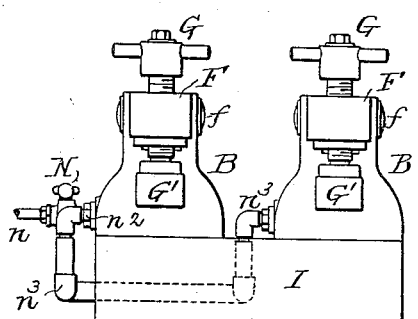

In the accompanying drawings: Figure 1, is a perspective view of my improved clamp; Fig. 2, is a longitudinal, sectional view; Fig. 3, is a plan view; and Fig. 4, is a view showing two clamps located side by side and operated by a single valve.

A is the base of the machine to which the clamp is applied.

B is the frame of the clamp and cast in the frame in the present instance is a cylinder C. The cap C′ of the cylinder forms an extended bearing for the plunger D to which is attached the piston D′ located in the cylinder C. $c$ is a stuffing box in the cap, as clearly shown in Fig. 2.

On the end of the plunger D is a wedge-shaped head $d$ having an abrupt, inclined surface $d'$ and a surface $d^2$ slightly inclined. The lower surface of the head is parallel with the center line of the plunger and travels on a roller $e$ mounted on a bracket E secured to the frame B. F is the clamping lever pivoted at $f$ to a bracket $b$ on the frame B. This clamping lever has a roller $f'$ at its rear end which rests upon the surfaces $d'$ and $d^2$ of the head $d$. In the short arm of the clamping lever F is a sleeve F′ which has an internal screw thread to which is adapted the threaded spindle G having a hub $g$ at its upper end with projecting arms $g'$ by which the spindle is turned.

Mounted so as to turn freely on the lower end of the spindle is a clamping head G′ having a toothed, V-shaped clamping surface $g^2$ and this head is confined to the end of the spindle by pins $h$, which extend into an annular groove in the end of the spindle, as shown in Fig. 2, so that while the spindle is free to be turned, the head, after contacting with the material to be clamped, remains in a fixed position and only has a movement to or from the work. I is the clamping block also having, in the present instance, a toothed V-shaped groove $i$ in which the work rests.

N is a four-way valve in the present instance which controls the flow of air to and from the cylinder. By the arrangement of pipes shown in Figs. 1 and 4 two clamps can be controlled by a single valve so that both clamps operate in unison.

$n$ is the inlet pipe $n'$ the exhaust and $n^2 n^2$ are the pipes leading to the ends of one cylinder and $n^3 n^3$ are pipes leading to the end of the cylinder of the other clamps.

By providing the head $d$ with an abrupt inclined surface $d'$, and a slight inclined surface $d^2$, the first movement of the plunger will bring the clamping head G′ quickly to the work and upon continuing the movement of the plunger the clamping head will be forced to firmly clamp the work. The incline of the surface $d^2$ is so slight that the head $d$ will hold the clamping lever to the work even if the pressure back of the plunger is released due to a defective valve on leaking pipes, and will only be released when pressure is applied to the forward side of the piston.

By mounting the clamping head on the adjustable spindle $g'$, the head G′ can be located in proper position with respect to the work and then—upon the movement of the plunger—the work can be readily and securely clamped. On the withdrawal of the plunger D, the head is raised by the weight of the long arm of the lever F, which overbalances the short arm and the mechanism carried thereby.

One power clamp may be used in connection with the block or a series of clamps may be used, according to the character of the work to be held. Where a number of pieces of work of the same size and shape are to be clamped, the spindle G is adjusted to the proper position: the material being quickly clamped or released without readjustment of the spindle, except when a piece of work of different size is to be held.

I claim:

1. The combination in a power clamp, of a frame having a cylinder therein; a piston located in the cylinder and having a plunger projecting rearwardly therefrom; a cap forming a bearing for the plunger; said plunger having a wedge-shaped head; a support for the under side of the head; a bracket on the frame; a clamping lever pivoted to the bracket and extending rearwardly and bearing upon the inclined surface of the head of the plunger and having a clamping head, and a clamp block under the clamping head so that as the plunger is projected, the lever will be caused to clamp the work to the block.

2. The combination in a power clamp, of a frame; a cylinder therein; a plunger mounted in the cylinder and having a head inclined on one surface; a fixed roller beyond the cylinder and on which the head of the plunger rests; brackets on the frame; a clamping lever pivoted to the brackets, the long arm of the lever extending rearwardly of the pivot and having a roller on its lower end resting on the inclined surface of the head of the plunger and having a clamping head on the short arm; and a clamping block under the clamping head so that as the plunger is projected, the clamping lever will be moved on its pivot and will clamp the work to the block.

3. The combination in a power clamp, of a frame; a cylinder; a plunger; a head on the plunger having an abruptly inclined surface and a slightly inclined surface; a clamping lever having one arm arranged to bear against the inclined surface of the head; and a clamping head carried by the other arm of the lever.

4. The combination of a frame; a cylinder therein; a cap secured to the end of the cylinder and having an extended bearing; a plunger mounted in the bearing; a piston on the inner end of the plunger and located in the cylinder; a head on the outer end of the plunger; said head having two surfaces of different inclines; a roller located under the head and mounted on a bracket projecting from the frame; a clamping lever pivoted to the frame and having a roller mounted on one arm and resting on the inclined surfaces of the head of the plunger; and a clamping head carried by the other arm.

5. The combination of a frame; a cylinder therein; a plunger mounted in the frame and having a piston located in the cylinder; means for supplying fluid under pressure to the other end of the cylinder; a head on the outer end of the plunger having a surface on the under side parallel with the center line of the plunger and having two surfaces one inclined at a greater angle than the other; a roller located under the head of the plunger and mounted in fixed bearings; a clamping lever pivoted to the frame; the long arm of said lever having a roller at its outer end resting on the inclined surface of the head of the plunger; a sleeve in the short arm of the clamping lever; said sleeve having an internal thread; a threaded spindle adapted to the threaded sleeve; a clamping head freely mounted on the end of the spindle; and a clamping block between which and the head the material is clamped; the parts being so constructed that on the first movement of the plunger the abrupt inclined surface of the head will move the clamping head to the work and the slight inclined surface will, on the continued movement of the plunger, cause the clamping head to grip the work.

In testimony whereof, I have signed my name to this specification, in the presence of two subscribing witnesses.

MAX MEYERS.

Witnesses:
Wm. A. Barr,
Jos. H. Klein.

---

Copies of this patent may be obtained for five cents each, by addressing the "Commissioner of Patents, Washington, D. C."